United States Patent
Meyer et al.

(10) Patent No.: US 11,797,693 B2
(45) Date of Patent: Oct. 24, 2023

(54) METHOD FOR SYNCHRONIZING FRAME COUNTERS AND ARRANGEMENT

(71) Applicant: DIEHL METERING SYSTEMS GMBH, Nuremberg (DE)

(72) Inventors: Benjamin Meyer, Nuremberg (DE); Christian Jambor, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 163 days.

(21) Appl. No.: 17/197,605

(22) Filed: Mar. 10, 2021

(65) Prior Publication Data

US 2021/0342460 A1 Nov. 4, 2021

(30) Foreign Application Priority Data

May 2, 2020 (DE) ...................... 10 2020 002 636.2

(51) Int. Cl.
*G06F 21/60* (2013.01)
*H04W 12/03* (2021.01)
(Continued)

(52) U.S. Cl.
CPC .......... *G06F 21/606* (2013.01); *H04J 3/0667* (2013.01); *H04J 3/0682* (2013.01);
(Continued)

(58) Field of Classification Search
CPC .......... G06F 21/606; G06F 2221/2151; H04W 12/03; H04W 12/106; H04W 4/38
(Continued)

(56) References Cited

U.S. PATENT DOCUMENTS 9,946,323 B1 * 4/2018 Murali .............. H04W 52/0235
10,555,257 B2 2/2020 Yang
(Continued)

FOREIGN PATENT DOCUMENTS

EP 3522621 B1 * 4/2021 ............. H04B 7/005
EP 3482587 B1 * 1/2023 ........... H04B 1/3805
(Continued)

OTHER PUBLICATIONS

Singh et al. "Protocol Support for High Availability of IKEv2/IPsec", Internet Engineering Task Force (IETF), Jul. 2011 (Year: 2011).*

(Continued)

*Primary Examiner* — Saleh Najjar
*Assistant Examiner* — Peiliang Pan
(74) *Attorney, Agent, or Firm* — Laurence A. Greenberg; Werner H. Stemer; Ralph E. Locher

(57) ABSTRACT

A method synchronizes frame counters for protecting data transmissions between a first end-device and a second end-device. The data, in particular data frames, are transferred between the first end-device and the second end-device. The data frames are provided with frame counters to protect the data transfer between the first end-device and the second end-device. The second end-device sends a first data frame to the first end-device. The first data frame contains a marker in its payload data. The first end-device sends back a second data frame as an answer to the second end-device. The second data frame contains a frame counter in the header data, and the second data frame contains the frame counter and the marker in its payload data.

17 Claims, 3 Drawing Sheets

(51) Int. Cl.
*H04J 3/06* (2006.01)
*H04L 9/40* (2022.01)

(52) U.S. Cl.
CPC ......... *H04L 63/0428* (2013.01); *H04W 12/03* (2021.01); *G06F 2221/2151* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 11,310,743 | B2* | 4/2022 | Awater | H04L 27/2614 |
| 11,582,692 | B2* | 2/2023 | Kim | H04W 52/0206 |
| 2013/0064220 | A1* | 3/2013 | Yin | H04W 36/00835 |
| | | | | 370/331 |
| 2017/0090510 | A1* | 3/2017 | Tennant | G06F 1/10 |
| 2017/0177697 | A1* | 6/2017 | Lee | G06F 1/14 |
| 2017/0177698 | A1* | 6/2017 | Lee | G06F 16/2315 |
| 2017/0299633 | A1* | 10/2017 | Pietrowicz | H04L 43/12 |
| 2019/0205244 | A1* | 7/2019 | Smith | G06F 3/065 |
| 2020/0044844 | A1* | 2/2020 | Sridhara | H04L 63/0442 |
| 2020/0241998 | A1* | 7/2020 | Kleiner | G06F 11/323 |
| 2020/0245137 | A1* | 7/2020 | Chitrakar | H04L 9/0833 |
| 2020/0280920 | A1* | 9/2020 | Huang | H04W 52/0235 |
| 2020/0329052 | A1* | 10/2020 | Goyal | H04W 12/106 |
| 2021/0383922 | A1* | 12/2021 | Horton | A61N 1/37252 |
| 2022/0141781 | A1* | 5/2022 | Gan | H04L 49/201 |
| | | | | 370/329 |
| 2022/0264456 | A1* | 8/2022 | Knowles | H04W 52/0277 |

FOREIGN PATENT DOCUMENTS

| | | |
|---|---|---|
| WO | 2015049138 A1 | 4/2015 |
| WO | 2018230147 A1 | 12/2018 |
| WO | 2019154136 A1 | 8/2019 |
| WO | WO-2020119322 A1 * | 6/2020 ........ H04W 52/0225 |

OTHER PUBLICATIONS

Menezes, "Hanbook of Applied Cryptography", 1965, CRC Press LLC, Boca Raton, Florida.

Seungjae NA, et al., , "Scenario and Countermeasure for Replay Attack Using Join Request Messages in LoRaWAN", 2017 International Conference on Information Networking (ICOIN), Da Nang, 2017, pp. 718-720.

* cited by examiner

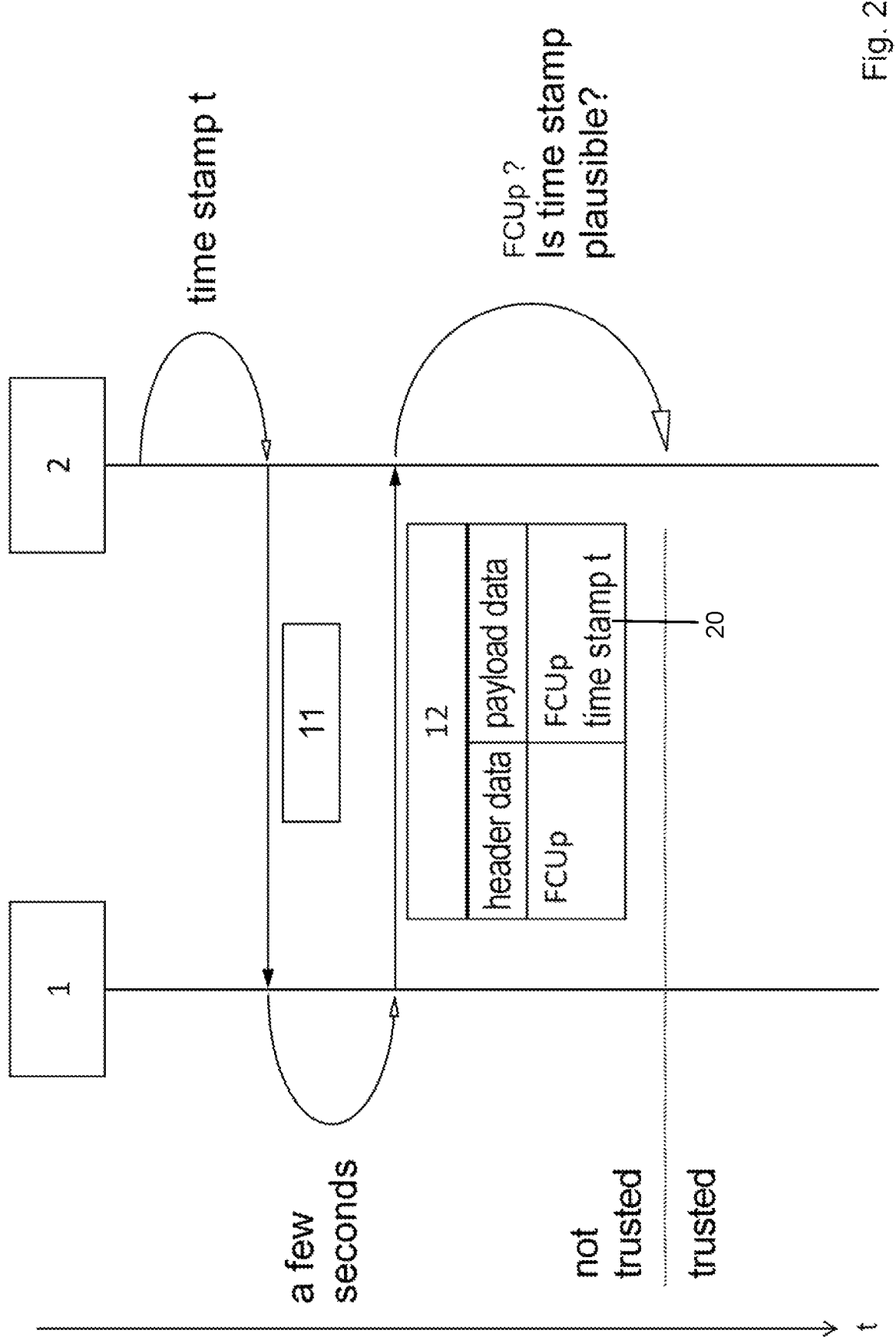

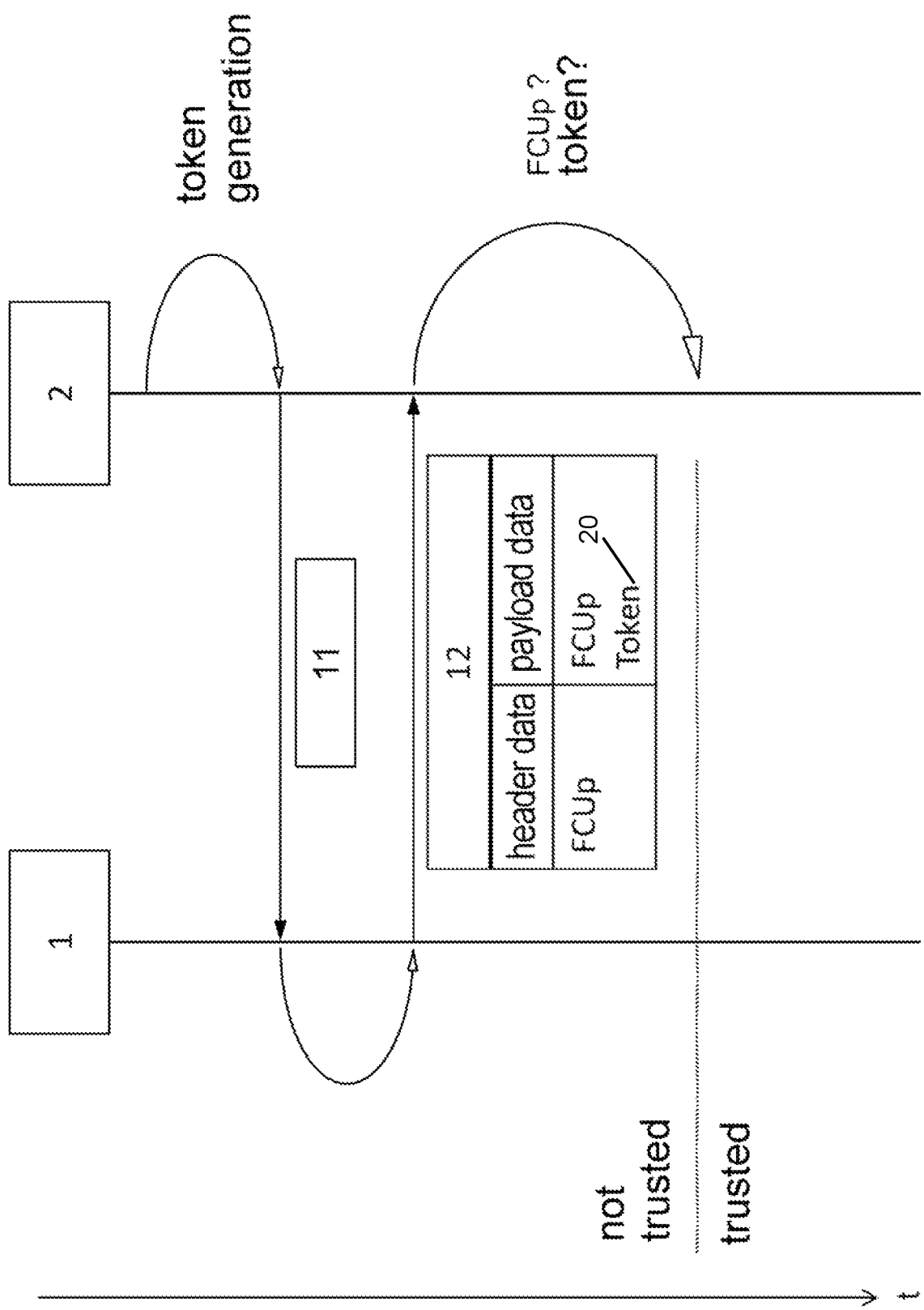

METHOD FOR SYNCHRONIZING FRAME COUNTERS AND ARRANGEMENT

CROSS-REFERENCE TO RELATED APPLICATION

This application claims the priority, under 35 U.S.C. § 119, of German patent application DE 10 2020 002 636.2, filed May 2, 2020; the prior application is herewith incorporated by reference in its entirety.

BACKGROUND OF THE INVENTION

Field of the Invention

The present invention relates to a method for synchronizing frame counters for the purpose of protecting data transmissions according to the preamble of the independent method claim. The present invention also relates to a configuration arrangement for transmitting data according to the preamble of the independent configuration claim.

The transmission of data from metering units such as, for instance, sensors, consumption meters or consumption-data acquisition devices, or components of smart home controllers, is becoming increasingly important in everyday use. An important area of use for metering units is the deployment of smart consumption-data acquisition devices, also known as smart meters. These are consumption-data acquisition devices that are typically integrated in a supply network, e.g. for energy, electricity, gas or water, which indicate to the particular utility customer the actual consumption, and use a communication network to transmit the consumption data to the supplier. The advantage of smart consumption-data acquisition devices is that it is possible to dispense with taking meter readings manually, and the supplier can invoice more quickly on the basis of actual consumption. In addition, far better utilization of the supply networks is possible.

Consumption-data acquisition devices of the type in question transmit the accrued measurement data usually in the form of data packets or datagrams by radio, for example in the short range device (SRD) or Industrial, Scientific, Medical (ISM) frequency band, to higher-level data collectors (e.g. concentrators, network nodes or control centers of a supplier). Datagrams are usually composed of a plurality of data packets. The SRD or ISM frequency bands have the advantage that they are unlicensed, and for use merely require general spectrum-management approval.

Electronic consumption-data acquisition devices containing a radio transmitter for wireless data transmission are often used for walk-in, walk-by, drive-by or fly-by readings. For this purpose, customer service personnel use mobile radio receivers to read the acquisition devices from a passing vehicle (drive-by) or when walking past (walk-by), without having to enter the building from which the readings are meant to be obtained. There are two crucial issues associated with smart consumption-data acquisition devices: the energy consumption, because these devices are usually battery-powered and are meant to have the longest possible maintenance intervals, and the operational reliability.

Long Range Wide Area Network (LoRaWAN) is a low-power wireless network protocol which uses regionally different frequency ranges in the ISM band and SRD band. The LoRa Alliance defines the LoRaWAN specification. In LoRaWAN, three counters, known as frame counters, are used in order to keep track of the uplink and downlink data messages. FCntUp counts the uplink data messages and is incremented with every uplink. NFCntDown counts data messages in the downlink that contain only MAC commands. AFCntDown counts downlink data messages carrying the application data. The FCntUp value is sent in the FCnt field of the uplink messages. The receiving network element synchronizes the FCntUp counter for the end-device with the received value. Similarly, either NFCntDown or AFCntDown is sent in the FCnt field of the downlink messages, and the receiving end-device synchronizes the relevant local counter with the received value. In both cases, the synchronization takes place only if the message is authenticated and the received counter value is incremented compared with the local counter value, which represents the previously valid value.

Previous solutions for synchronizing frame counters include time-synchronization between two end-devices or using random numbers or nonces in the transmitted data. Time stamps are transferred between the end-devices for the time-synchronization. For this purpose, one end-device sends its own time stamp in the encrypted payload data, and the other end-device checks the plausibility of the time stamp. This has the disadvantage, however, that the performance cannot always be guaranteed for rapid data transfer, i.e. given a short send and/or receive window. In addition, the time stamp of the end-device must be precise enough to be able to be used for time-synchronization. When using random numbers or nonces, one end-device sends a random number to the other end-device, whereupon this end-device enters the received number in the encrypted payload data of the answer in order to authenticate itself. The disadvantage here is that when generating random numbers, it is necessary to ensure sufficient entropy and also to keep a buffer memory for the already generated random numbers so that the answer can be checked. This increases the complexity of the data transmission process. There is therefore a need to simplify the synchronization of frame counters without compromising transmission security.

International patent disclosure WO 2018/230147 A1, corresponding to U.S. patent publication 2020/0245137, discloses a method for generating a message integrity code (MIC). This is used to protect wake-up messages (WUR) from replay attacks. To prevent replay attacks, the sender must ensure that each MIC calculation uses a unique input or random number (salt or nonce) that is different for each wake-up message. The wake-up message is protected by replacing the address field with the message integrity code.

The publication by SeungJae Na, DongYeop Hwang, WoonSeob Shin and Ki-Hyung Kim, "Scenario and Countermeasure for Replay Attack Using Join Request Messages in LoRaWAN", 2017 International Conference on Information Networking (ICOIN), Da Nang, 2017, pp. 718-720, investigates the potential to exploit the join process arising from security vulnerabilities. It describes a possible replay attack by means of intercepted join requests. It is suggested as a countermeasure to use a token that masks the DevNonce used and the MIC of the join request. The masked join requests are sent from the end-device to the network server, which performs the unmasking.

International patent disclosure WO 2015/049138 A1 describes methods and systems for the secure transmission of time-synchronization packets by a master node in a network environment. The method includes generating by means of a processor a time packet marking of a predetermined bit size. The method further includes the processor encrypting the time packet marking with a lightweight encryption technique to generate a master signature. The method also includes the processor appending the main signature to an encrypted time-synchronization packet generated by the master node to obtain an extended encrypted packet, where the encrypted time-synchronization packet contains a send time-stamp for the time-synchronization. The method further includes the master node transmitting the extended encrypted packet to a slave node in the network environment for the purpose of time-synchronization.

International patent disclosure WO 2019/154136 A1, corresponding to U.S. Pat. No. 10,555,257, describes a method for operating a station assigned to an access node. The method includes receiving one or more Wake-Up radio beacons, each of which contains timing information and an identifier associated with the access node, wherein the station is configured such that it receives the beacons to this first timing information using a receiver, and reports information to the access node about the one or more beacons, the information containing at least one of second timing information, signal quality information, or error information.

BRIEF SUMMARY OF THE INVENTION

The object of the present invention is to provide a novel method for protecting data transmissions and a corresponding arrangement that allow increased operating flexibility for lower complexity in parallel with advantageous energy efficiency.

The aforementioned object is achieved by the entire teaching of independent method claim and by a configuration according to the independent configuration claim. The dependent claims contain advantageous embodiments of the invention.

According to the invention, a method for synchronizing frame counters (FC) is provided, which method is used to protect data transmissions between a first end-device, in particular an endpoint, in particular a sensor, in particular a smart meter, in particular a consumption meter, and a second end-device, in particular a base station, in particular a data collector, in particular a mobile readout system. The data, in particular data frames, are transferred between first end-device and second end-device. The data frames are provided with frame counters (FC) to protect the data transfer between first end-device and second end-device. In a characterizing manner, the second end-device sends a first data frame, in particular a wake-up data frame, to the first end-device. The first data frame contains a marker, in particular in the payload data, the first end-device sends back a second data frame as an answer to the second end-device. The second data frame contains a frame counter (FC) in the header data, and the second data frame contains the frame counter (FC) and the marker in the, in particular encrypted, payload data.

The invention offers the advantage that the marker is provided by the second end-device. In terms of its function, the second end-device can be, in particular, a base station, a data collector or a mobile readout system which reads data, data frames or, in particular, consumption data from the first end-device. The first end-device can be, in particular, an end point, a sensor, a smart meter or a consumption meter which holds data, in particular consumption data, ready for retrieval.

The use of frame counters can serve to protect against replay attacks. Again, however, the initialization of frame counters or their synchronization is susceptible to replay attacks. The present invention provides a solution of this type.

In a possible use, the second end-device is not in constant communication with the first end-device, but only during the time of the data readout. The synchronization of the frame counters between the two devices is thus used to resume communication or data transfer. The first and second end-devices may preferably have already established communication or a network session at an earlier time, in which process the frame counters were reset to the value zero (0), for example. The invention offers the advantage that the last valid frame-counter values or their increments can now be re-used when communication is re-established, without the need for the frame counters to be reset again, while still having sufficient protection against replay attacks.

It is possible that the end-devices are not in constant contact. The situation might thus arise in which messages having higher frame counters have already been sent from the first end-device that were not received by the second end-device. These unreceived messages, however, might have been intercepted by a third party and used as a replay attack against the second end-device when contact is re-established. The present invention removes this attack vector by synchronizing the frame counters of the first and second end-devices before any data transfer, in particular protected by frame counters, takes place between the two end-devices.

The synchronization of frame counters can be used when establishing communication between two end-devices for the first time or if a data transfer between the two end-devices has already taken place in the past. Hence the synchronization can also be used for a new setup or an initialization of frame counters.

The synchronization of the frame counters is preferably initiated by the second end-device. The second end-device can expediently send a wake-up frame or a sync frame for this purpose.

The marker is hence used, or entered in the data frames, only for establishing or re-establishing communication between the first and second end-devices. Frame counters can serve as protection against replay attacks once this initial transfer has taken place. This has the advantage that the marker does not have to be modified or re-created for every data transfer. The marker can be transferred and verified advantageously only at the start of a new network session or at the start of re-establishing a connection. This advantageously eliminates the disadvantages of a time stamp, which would have to be kept constantly up-to-date or synchronized, and of a random number or nonce, the random generation and storage of which would have to be ensured.

It is particularly expedient that the second end-device receives the second data frame and compares the frame counter (FC) in the header data with the frame counter (FC) in the payload data, and compares the marker in the first data frame with the marker in the payload data of the second data frame, and designates the first end-device as trusted on there being a match of the frame counters (FC) and of the markers.

Returning the marker ensures that it is an authentic answer from the first end-device to the request from the second end-device, in which request this marker was sent. It can hence be ruled out that this is an answer from the first end-device that was previously recorded by a third party and is being used as part of a replay attack as an answer to the request by the second end-device.

Preferably, the marker can be a time stamp (t), where the time stamp (t) represents the current time at the time of sending the first data frame, and the time stamp (t) in the second data frame is checked for plausibility, for which purpose the time of sending the first data frame and delays in transmission and/or processing in the first end-device are taken into account.

For example, the first end-device may not have a precise timer, for instance may have a low-quality crystal oscillator, with the result that the internal clock of the first end-device differs from that of the second end-device. The second end-device can advantageously have a precise timer, for instance in the form of a high-quality crystal oscillator. The first end-device can expediently be energy self-sufficient in its operation, and therefore low energy consumption is desirable. In particular, the first end-device may be a "constrained device".

The time stamp (t) returned in the second data frame can be the time stamp (t) already received in the first data frame. Alternatively, it is possible for the first end-device to return in the second data frame a time stamp (t*) based on the internal clock belonging to the first end-device. As a result of an imprecise timer, the internal clock of the first end-device may differ from that of the second end-device, and therefore this discrepancy is also taken into account in the plausibility check.

The advantage is that a time stamp does not have to be sent periodically or with every transmission, but only for the synchronization of the frame counters. For further data transfer, it is then sufficient to use the frame counters as protection against replay attacks. Thus there is no need for the first end-device to have a precise time stamp. The overall performance of the system is therefore not dependent on the time-synchronization or the precision of the time stamp from the first end-device.

The transmitting end-device performs a check to ascertain a difference between the time stamp sent and the time stamp received. A certain difference may be allowed here in order to take into account transmission delays and/or processing delays or other influences or interference factors. It can therefore be sufficient to check the time stamps for plausibility.

Alternatively, the marker can be a token, wherein the second end-device generates the token before sending the first data frame by generating once for the synchronization a random number, which acts as the token in the first data frame.

Using a token as the marker provides another possible way of authenticating the end-device. For this purpose, the second end-device can generate a random number (nonce) at the start of communication between the two end-devices. This random number is sent as the token in the first data frame from the second end-device to the first end-device. The first end-device incorporates this token in the corresponding answer from the first end-device to the second end-device. In addition to the token, it is expediently possible to incorporate the frame counters and, for example, the meter reading in the case of a consumption meter. The contents of the answer can be validated by successful verification of the token in the second end-device. The accompanying meter value, for example, is thereby deemed valid, and the synchronized frame counters can be used for further communication with the first end-device.

It is also possible for the token to serve as a network session key in communication between the two end-devices. Alternatively, a client nonce (cnonce) can be used as a nonce. In an alternative embodiment, it is possible that the marker contains a time stamp and a random number and/or nonce.

Preferably, further data frames from the first end-device to the second end-device can contain incremented frame counters (FC+), which are incremented for each further data frame, and, once the first end-device is designated as trusted, the validity of the further data frames from the first end-device is determined in the second end-device by comparing the incremented frame counter (FC+) contained in the further data frame with the increment of the frame counter (FC) of the data frame preceding this further data frame, and the further data frame is deemed valid if the frame counter (FC) and the incremented frame counter (FC+) are consistent.

The preceding data frame can be the second data frame, which was used to synchronize the frame counters, or a data frame that was sent after synchronization of the frame counters and whose validity was confirmed solely by the frame counter sent therewith.

The frame counter (FC) in the header data in the second data frame and the frame counter (FC) in the payload data of the second data frame can expediently be a frame counter for the uplink (FCUp). It is hence possible for the second end-device to receive the second data frame and to compare the frame counter for the uplink (FCUp) in the header data with the frame counter for the uplink (FCUp) in the payload data, and to compare the marker in the first data frame with the marker in the payload data of the second data frame, and to designate the first end-device as trusted on there being a match of the frame counters for the uplink (FCUp) and of the markers. It is also possible that the second data frame contains, in particular in the payload data, a frame counter for the downlink (FCDown). It is hence advantageously possible to distinguish between frame counters that were used in the uplink, i.e. from the first end-device to the second end-device, and frame counters that were used in the downlink, i.e. from the second end-device to the first end-device. The synchronization can advantageously comprise aligning the values of the frame counters for the uplink and/or the downlink respectively for both end-devices.

Care must also be taken to prevent frame counters from overflowing, in order to avoid re-using any already used frame counters. If an overflow is foreseeable, there may be a need to set up a new session. The method according to the invention can also be used to synchronize a new set of frame counters, as long as initial communication has already been set up and the existing frame counter threatens to overflow. A network session can comprise the value of the frame counters for the uplink and for the downlink.

The second end-device can advantageously be a mobile end-device, wherein the first end-device and the second end-device move at a relative speed to each other. The method according to the invention for synchronizing frame counters is streamlined in design in order to achieve the desired performance even at relative speeds. It is particularly suitable for this use since a marker, in particular a time stamp and/or a random number, is used only for synchronizing the frame counter, and further communication can be protected against replay attacks solely by means of frame counters. This means, for example, that there is no need for time-consuming time-synchronization between the end-devices. This would be necessary were time stamps used for each data frame. According to the invention, a time stamp, which assumes the function of a marker, is required only in one data frame, for example. Moreover, there is also advantageously no need for additional complexity, as would be the case with the use of random numbers or nonces. In this case, random numbers would need to be generated for each data frame, and also they would need to be stored for future comparison. Generating a random number is only necessary for one data frame, for example, in the present invention.

The relative speed can expediently be up to 70 kilometers per hour, in particular up to 50 kilometers per hour. It is hence possible, for example, for data readout also to be performed from a vehicle. This has the advantage that the readout is not dependent on the speed of the passing movement. It is also advantageous that for the data transfer, the relative speed is reduced by less than 50%, in particular by less than 20%, in particular by less than 10%, and in particular no reduction in relative speed takes place. Thus expediently there is no need to adjust the speed or the driving style during readout by the readout receiver.

In another independent claim, the present invention claims an arrangement for transmitting data, containing at least one first end-device and a second end-device, wherein the first end-device and the second end-device each comprise communication means in order to transfer data, in particular data frames, between first end-device and second end-device, wherein the data frames are provided with frame counters (FC) to protect the data transfer between first end-device and second end-device, wherein, in a characterizing manner, in order to protect data transmissions, frame counters (FC) can be synchronized in accordance with a method described above.

The arrangement makes it possible for frame-counter synchronization to be performed easily between the first and second end-devices. It offers the additional advantage that this synchronization is not confined to one first end-device, and therefore the second end-device can synchronize frame counters with a plurality of first end-devices. For each connection between second end-device and a first end-device, use is made of a separate frame counter, or separate frame counters, for the uplink or downlink.

Other features which are considered as characteristic for the invention are set forth in the appended claims.

Although the invention is illustrated and described herein as embodied in a method for synchronizing frame counters and an arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a simple schematic diagram of the frame-counter synchronization using a time stamp as a marker; and FIG. 3 is a simple schematic diagram of the frame-counter synchronization using a random number as the marker.

DETAILED DESCRIPTION OF THE INVENTION

Figure 1:
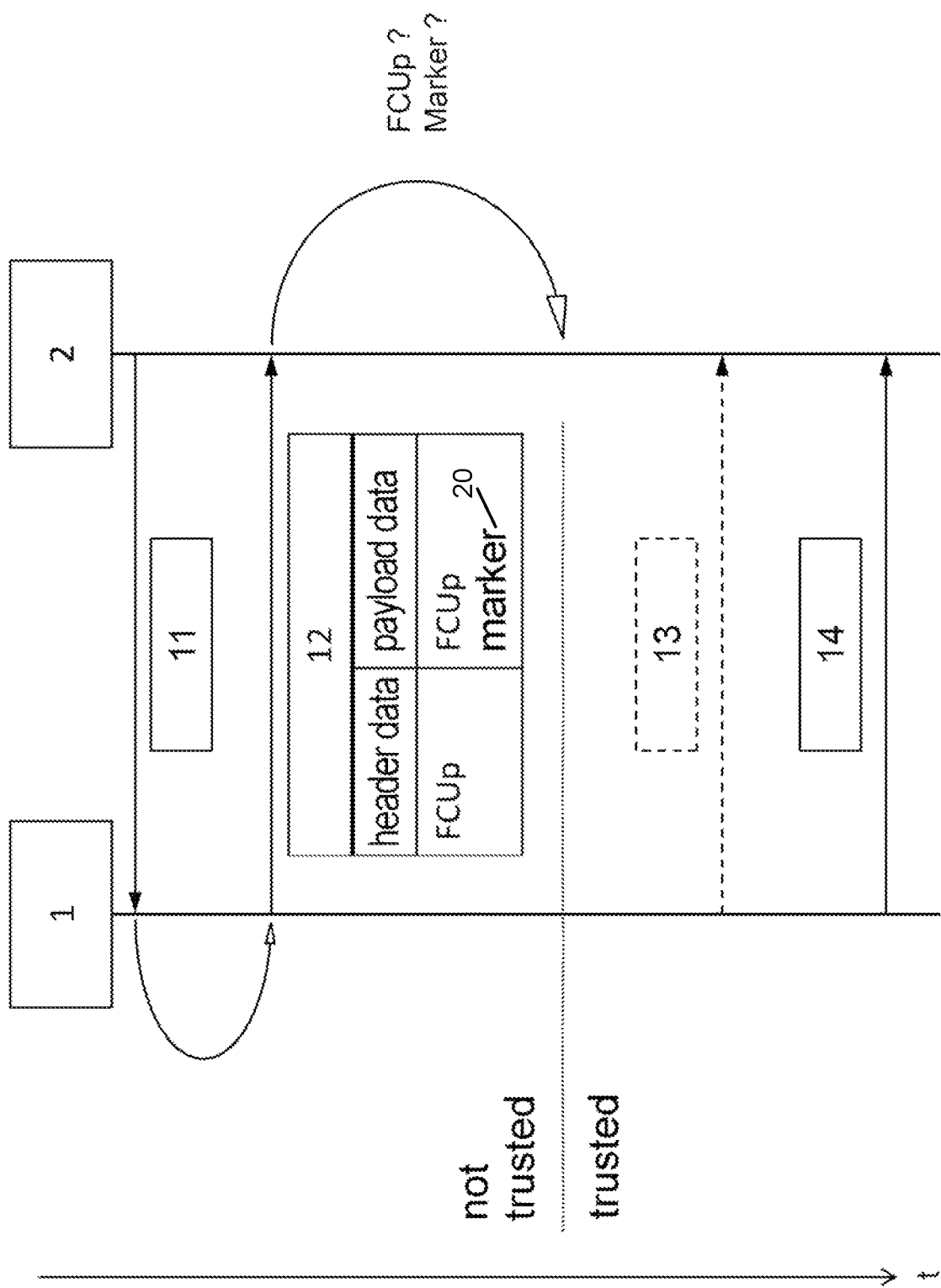
FIG. 1 is a simple schematic diagram of frame-counter synchronization.

Referring now to the figures of the drawings in detail and first, particularly to FIG. 1 thereof, there is shown a simple schematic diagram of frame-counter synchronization. Reference number 1 in FIG. 1 denotes a first end-device, and reference number 2 denotes a second end-device. The second end-device 2 sends a first data frame 11 to the first end-device 1. The first data frame 11 is a wake-up data frame, for example. The first data frame 11 contains a marker 20 in its payload data. The first end-device 1 receives the first data frame 11 and thereupon sends an answer to the second end-device 2 in the form of a second data frame 12. The second data frame 12 contains header data and payload data. The payload data is encrypted. A current frame counter FC is transmitted in the header data. The frame counter FC can preferably be the frame counter for the uplink FCUp. The current frame counter FC, or frame counter for the uplink FCUp, is also transmitted in the payload data of the second data frame 12. The payload data of the second data frame 12 also contains the marker 20. The frame counter FC and the marker 20 in the payload data are transmitted in encrypted form. Once the second data frame 12 has been received, the payload data is decrypted and checked in the second end-device 2. For this purpose, the frame counter FC in the header data of the second data frame 12 is compared with the frame counter FC in the payload data of the second data frame 12, and the marker 20 in the payload data of the second data frame 12 is compared with the marker 20 sent in the first data frame 11. If the frame counters FC match and the markers 20 match, the first end-device 1 is designated as trusted. The second end-device 2 can, for example, make an entry to this effect in its internal memory as a note.

Before the frame counters FC are synchronized, the first end-device 1 is not trusted, and is trusted once synchronization is successful. For further data transfer, only frame counters FC are used to protect against replay attacks. The frame counters FC+ are incremented for further data frames 14 from the first end-device 1 to the second end-device 2. By this time, the first end-device 1 has already been designated as trusted, and therefore the validity of the further data frames 14 is determined by comparing the incremented frame counters FC+ contained therein with the increment of the frame counter FC of the data frame 12,13 preceding this data frame 14. The preceding data frame 12 may be the data frame for synchronization or any data frame 13 that was transferred chronologically between the data frame 12 for synchronization and the further data frame 14.

FIG. 2 is a simple schematic diagram of synchronizing frame counters FC using a time stamp t as a marker 20. The time stamp t represents the current time in the second end-device 2 at the time of sending the first data frame 11. The time stamp t is transmitted to the first end-device 1 in the first data frame 11. In the first end-device 1, the received data frame 11 is processed, and after a few seconds an answer in the form of a second data frame 12 is sent to the second end-device 2. The delay between receiving the first data frame 11 and sending the second data frame 12 in the first end-device 1 can be influenced, for example, by interference in the transmission path and/or by the speed at which the first data frame 1 is processed. The second data frame 12 contains in its header data and in its payload data the current frame counter FC, or the current frame counter for the uplink FCUp. The second data frame 12 contains as the marker 20 in the payload data, the time stamp t received from the second end-device 2. The frame counter FC and the time stamp t in the payload data are transmitted in encrypted form. Once the second data frame 12 has been received, the payload data is decrypted and checked in the second end-device 2. For this purpose, the frame counter FC in the header data of the second data frame 12 is compared with the frame counter FC in the payload data of the second data frame 12, and the time stamp t in the payload data of the second data frame 12 is compared with the time stamp t sent in the first data frame 11. This involves checking the frame counters FC and the time stamps t for a match. In the case of the time stamps t, an exact match is not required, and therefore the time stamps t are checked only for plausibility. The time of sending the first data frame 11 and delays in the transmission path and in the processing in the first end-device 1 are taken into account for a plausible time stamp t. For example, the first end-device 1 may not have a precise timer, for instance may have a low-quality crystal oscillator, with the result that the internal clock of the first end-device 1 differs from that of the second end-device 2. The second end-device 2 can advantageously have a precise timer, for example in the form of a high-quality crystal oscillator. If the frame counters FC match and the time stamps t are deemed plausible, the first end-device 1 is designated as trusted. The second end-device 2 can, for example, make an entry to this effect in its internal memory as a note.

FIG. 3 is a simple schematic diagram of synchronizing frame counters FC using a token Tk as a marker 20. At the start of the synchronization process, a random number or nonce is generated in the second end-device 2. This random number is used as the token Tk in the wake-up signal for the first end-device 1. This is done by transmitting the token Tk to the first end-device 1 in the first data frame 11. In the first end-device 1, the received data frame 11 is processed, and after a few seconds an answer in the form of a second data frame 12 is sent to the second end-device 2. The second data frame 12 contains in its header data and in its payload data the current frame counter FC, or the current frame counter for the uplink FCUp. The second data frame 12 contains as the marker 20 in the payload data, the token Tk received from the second end-device 2. The frame counter FC and the token Tk in the payload data are transmitted in encrypted form. Once the second data frame 12 has been received, the payload data is decrypted and checked in the second end-device 2. For this purpose, the frame counter FC in the header data of the second data frame 12 is compared with the frame counter FC in the payload data of the second data frame 12, and the token Tk in the payload data of the second data frame 12 is compared with the token Tk sent in the first data frame 11. If the frame counters FC match and the markers 20 match, the first end-device 1 is designated as trusted. The second end-device 2 can, for example, make an entry to this effect in its internal memory as a note.

The following is a summary list of reference numerals and the corresponding structure used in the above description of the invention:
1 first end-device
2 second end-device
11 first data frame
12 second data frame
13 preceding data frame
14 further data frame
20 marker
Tk token
t time stamp
FC frame counter
FCUp frame counter for the uplink
FCDown frame counter for the downlink

The invention claimed is:

1. A method for synchronizing frame counters to protect data transmissions between a first end-device and a second end-device, which comprises the steps of:
   transferring data, via data frames, between the first end-device and the second end-device, wherein the data frames are provided with frame counters to protect a data transfer between the first end-device and the second end-device;
   sending, via the second end-device, a first data frame to the first end-device, wherein the first data frame being a wake-up data frame, and wherein the first data frame containing a marker in its payload data;
   sending backing, via the first end-device, a second data frame as an answer to the second end-device, wherein the second data frame containing a frame counter in its header data, and the second data frame containing the frame counter and the marker in its encrypted payload data; and
   receiving, at the second end-device, the second data frame and comparing the frame counter in the header data of the second data frame with the frame counter in the payload data of the second data frame, and comparing the marker in the first data frame with the marker in the payload data of the second data frame, and designating the first end-device as trusted on there being a match of the frame counters and of the markers.

2. The method according to claim 1, wherein:
   the marker is a time stamp, the time stamp represents a current time at a time of sending the first data frame; and
   the time stamp in the second data frame is checked for plausibility, for which purpose a time of sending the first data frame and delays in transmission and/or processing in the first end-device are taken into account.

3. The method according to claim 1, wherein:
   the marker is a token; and
   the second end-device generates the token before sending the first data frame by generating once for synchronization a random number, which acts as the token in the first data frame.

4. The method according to claim 1, which further comprises sending further data frames from the first end-device to the second end-device which contain incremented frame counters, which are incremented for each further data frame, and, once the first end-device is designated as trusted, a validity of the further data frames from the first end-device is determined in the second end-device by comparing an incremented frame counter contained in a further data frame with an increment of the frame counter of the data frame preceding the further data frame, and the further data frame is deemed valid if the frame counter and the incremented frame counter are consistent.

5. The method according to claim 1, wherein the frame counter in the header data in the second data frame and the frame counter in the payload data of the second data frame is a frame counter for an uplink.

6. The method according to claim 5, wherein the second end-device receives the second data frame and compares the frame counter for the uplink in the header data with the frame counter for the uplink in the payload data, and compares the marker in the first data frame with the marker in the payload data of the second data frame, and designates the first end-device as trusted on there being a match of the frame counters for the uplink and of the markers.

7. The method according to claim 5, wherein the second data frame contains a frame counter for a downlink.

8. The method according to claim 5, wherein the second data frame contains in the payload data, a frame counter for a downlink.

9. The method according to claim 1, wherein the second end-device is a mobile end-device, wherein the first end-device and the second end-device move at a relative speed to each other.

10. The method according to claim 9, wherein the relative speed is up to 70 kilometres per hour.

11. The method according to claim 9, wherein for the data transfer, the relative speed is reduced by less than 50%.

12. The method according to claim 9, wherein the relative speed is up to 50 kilometres per hour.

13. The method according to claim 9, wherein for the data transfer, the relative speed is reduced by less than 20%.

14. The method according to claim 1, wherein:
   the first end-device is an end point, a sensor, a smart meter, or a consumption meter;
   the second end-device is a base station, a data collector, or a mobile readout system; and
   the second data frame contains the frame counter and the marker in the encrypted payload data.

15. The method according to claim 9, wherein for the data transfer, the relative speed is reduced by less than 10%.

16. The method according to claim 9, wherein for the data transfer no reduction in relative speed takes place.

17. A configuration for transmitting data, the configuration comprising:
   a first end-device;
   a second end-device; and
   said first end-device and said second end-device each containing communication means in order to transfer data frames between said first end-device and said second end-device, wherein the data frames are provided with frame counters to protect a data transfer between said first end-device and said second end-device, and in order to protect data transmissions, said frame counters are synchronized according to a method of claim 1.

* * * * *